Oct. 4, 1927.

G. C. THOMAS, JR 1,644,295

CABLE CONNECTER

Filed Jan. 22, 1924

Inventor
George C. Thomas, Jr

By Attorneys
Dohleber & Ledbetter

Patented Oct. 4, 1927.

1,644,295

UNITED STATES PATENT OFFICE.

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY.

CABLE CONNECTER.

Application filed January 22, 1924. Serial No. 687,782.

This invention relates to combination outlet boxes and cable connecters, and more particularly to improvements in connecters for use in anchoring electric cables or conduits to electric box fixtures, such as outlet boxes, switch boxes, cable boxes, and the like.

An object of the invention is to produce an improved cable connecter of simple structure capable of being manufactured, preferably by stamping the connecter from sheet metal and which embodies a small quantity of material. Likewise it is an object to produce a cable connecter which positively functions to securely fasten cable to said box, as well as produce a cable connecter which fits standard round knock-out holes in boxes of present-day use; and one important feature of my connecter resides in the fact that it simultaneously straddles the box wall and box hole edge and has means for simultaneously setting up an anchoring relation jointly with the cable and box.

A further object of the invention is to produce simple plate-like connecter structure embodying two plain stampings which, when assembled with operating or pressure producing means such for example a screw, the said connecter functions to simultaneously grip a cable as well as anchor itself to a box.

Another object of the invention is to produce a cable connecter including box hole anchorage means into and between which a box hole edge is received or seated to movably guide and retain the connecter in the box hole while it moves in relation to the box hole edge in consequence of attaining its final anchored and cable gripping position. The connecter, when introduced into a box hole, leaves a part of the box hole edge exposed directly to a cable so that the cable may be gripped against the exposed box hole edge; and with the foregoing features is combined a single operating, pressure producing or cable clamp means, such as a screw, which is so placed as to be easily accessible through the open end of the box. This screw operates inside the box to move the connecter and its anchorage means relatively to the box hole to grip and fasten the cable between the exposed box hole edge and connecter and to simultaneously anchor the connecter to the box. The screw and connecter parts are so arranged and constructed that the screw does not clamp against the cable or engage the box.

The accompanying drawing illustrates an embodiment of the invention serving to illustrate the principle and structure thereof as well as the mode of operation; and the design and operation of the parts may be modified without departing from the scope and principle of my invention.

Figure 1:
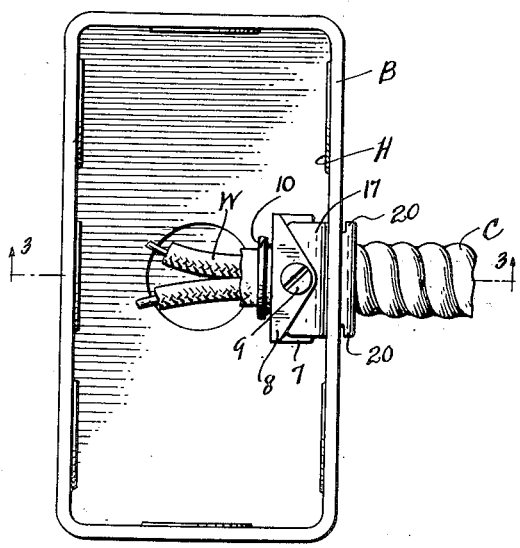
Figure 1 illustrates a top open view of an electrical fixture box such as an outlet box, together with a cable and connecter assembled therewith.
Figure 2:
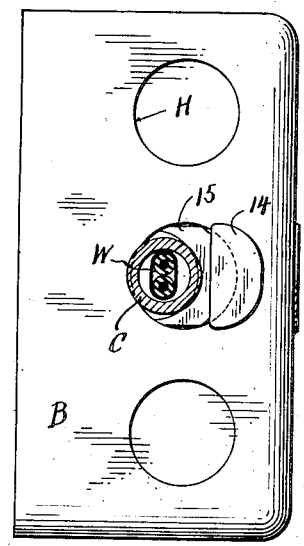
Figure 2 illustrates an end projection of Figure 1.

The connecter constituting this invention is preferably composed of two stampings of simple design one of which acts as a support which may include a bushing through which the cable wires pass into the box, while the other plate constitutes an abutment and pinching or gripping element by which the cable is jammed against the box hole edge and by which the connecter is itself anchored in the box hole. The cable C and wires W thereof are held in the knock-out opening H of the box B, and this improved connecter performs such purposes and is simple in structure and inexpensive to produce as well as being positive in its action.

Referring further to the drawings for a more detailed description of the invention, there is shown a bushing and screw supporting plate 6 on the lower end of which may be formed a foot 7 and on the upper end of which is preferably made a screw retaining ear 8 provided with an aperture adapted to freely carry a screw 9 intended to draw upwardly the gripping abutment plate. The bushing plate 6 is provided with a bushing 10 through which cable wires W are passed and which protects the wires from being damaged or abraded while manipulating the wires in the box in making electrical connections.

A box hole abutment or cable gripping plate in the form of an outer cover plate 14 made on an inner abutment plate 15 is provided with a cable receiving hole 16. The upper end of the inner plate 15 is bent outwardly in the form of an ear 17 made with a threaded screw hole 18 to receive the screw 9. Thus by turning the screw 9 the cable gripping plate 15 is lowered or elevated relatively to the bushing plate 6. The offset parallel plate portions 14 and 15 are integrally joined by a horizontal shoulder web 19 which is preferably cut somewhat narrower than the two plates 14 and 15, and thus there is formed a shoulder or notch 20 to offset the gripping plate portions 14 and 15 sufficiently to receive the box wall B therebetween with the box hole H in axial alignment with the cable connecter holes 10 and 16.

Figure 3:
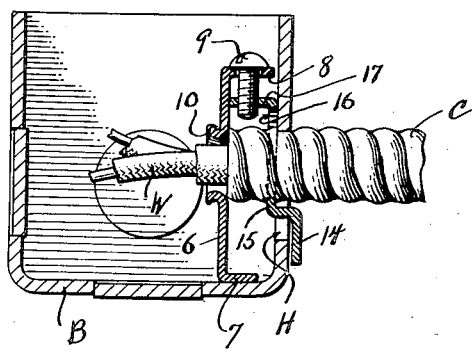
Figure 3 shows a vertical sectional view on the line 3—3.
Figure 4:
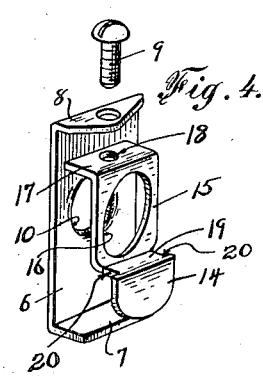
Figure 4 is a perspective view of the stampings disposed in spaced relation together with a drawing or forcing means such as screw for bringing the parts together upon a box and cable.

In assembling the parts, the cable gripping connecter member 14—15 is inserted through the box knock-out H with the lower end 14 thereof projecting from the inside of the box, and the cable C is inserted through both holes H and 16. The bushing plate 6 is now set in position as shown in Figure 3, and the screw 9 is turned downwardly into the ear 17 whereupon the pinch plate 14—15 draws upwardly closing in on the cable C gripping and jamming it tightly against the box hole edge H as well as gripping the edge of the hole 16 into the cable. The force of the drawing screw 9 firmly sets the plate 6 against the box wall B and the foot 7 acts as a support affording considerable bearing area whereby it is positively held against displacement at the bottom, while the screw 9 holds the parts in rigid relation at the top.

The shoulder web 19 together with the shoulder notches 20 fit the circumference of the box opening H, and as the plate 15 travels upwardly to grip the cable C, the said notches 20 seat firmly against the box hole edge H. The two abutment plates 14 and 15 now have the box wall B between them and thus the connecter is anchored in the box hole. The shoulders 20 and plate 14 prevent the cable connecter from moving inwardly while the inner plate 15 prevents it from moving outwardly. The cable C is tightly held by the hole edge 16 as well as the box opening edge H, and it is observed how both the box and connecter taken together circumferentially bears substantially around the entire cable wall, thus distributing the pressure and protecting the cable from crushing.

I have therefore produced a connecter having separate parallel plates, one of which 6 is stationary and is provided with a hole 10 through which the wires pass and bushed at 10 if desired, while the other plate 15 is movable laterally in relation to the box hole H to grip the cable C which rests between the approaching hole edges 16 and H.

The abutment plate 15 may to advantage be made somewhat wider than the diameter of the box hole H which fixes the cable C and itself as well against movement in one direction while the abutment plate 14 is narrower and reaches through the box hole H and fixes the cable against movement in the other direction.

The abutment plate having the off-set inside and outside portions 15 and 14 cover over the box hole around the cable C but exposes the box hole edge so that the cable rests in direct contact therewith. The screw 9 is mounted on the connecter above the cable and is readily accessible. As the screw is turned, the abutment plate 14—15 slides upwardly executing the cable gripping function and firmly anchoring all parts together.

What I claim is:—

1. A cable connecter comprising a flat part provided with an opening through which cable wires are passed, a foot formed on one end thereof, a screw retaining ear made on the other end thereof, a screw carried by the ear, and a cable pinching plate having a cable opening therein carried by the screw.

2. Cable and box connecting means comprising, a box with a hole, a connecter embodying two flat plates mounted in parallel spaced relation in the box, one plate having a portion formed to fit through the box hole and project on the outside thereof and including a cable hole, and a screw cooperating with the two plates moving one in relation to the other and to the box hole to grip a cable between the connecter and box hole edge.

3. A cable connecter comprising, two spaced parallel members, operating means connecting them together at one end and acting to move one in relation to the other, the free end of one member adapted to rest on a box wall, the free end of the other member including means to hold it slidably adjacent a box hole for movement relative thereto and including a hole into which a cable is received.

4. A connecter as defined in claim 3 wherein the parallel members are stamped sheet metal plates, and the free end of the sliding plate is formed to fit through the box hole.

5. A connecter comprising a stationary plate one end of which is adapted to rest against a box wall, a screw mounted thereon, a movable plate one end of which is engaged by the screw and having an off-set which forms parallel portions spaced apart to receive a box wall, and the lower off-set end of the movable plate being formed to pass through a box hole and itself including a cable receiving hole.

6. A connecter as defined in claim 5 wherein the lower off-set end which passes through a box hole closes said hole about the cable.

7. A connecter as defined in claim 5 wherein an ear is included on the adjacent ends of each plate for reception of said screw.

8. A connecter comprising a cable gripping plate having an off-set which forms parallel spaced abutment portions, one of which is smaller than the other and formed to pass through a box hole and expose the hole edge and adapted to rest adjacent the outside of a box wall, the other portion being too large to fit through a box hole and adapted to rest against the inside of a box wall and including a cable receiving hole, and a stationary screw support adapted to rest against a box, and a screw carried for free rotation by the support and threaded into the plate to move it in relation to the support and box hole.

9. A connecter comprising, a plate including an end formed small enough to pass through a box hole, an offset in the plate forming parallel ends spaced apart a distance about equal to the thickness of a box wall, one end of the plate adapted to rest inside and parallel to a box wall and the other plate end parallel to and outside a box wall, said plate having a cable receiving opening in that end which is inside a box which opening is adapted to register with a box hole, and a screw with means supporting it in spaced relation from the box and from a cable, said screw being threaded into the plate to move it in relation to the box hole to grip a cable between the box hole edge and the edge of the cable receiving opening.

10. A cable connecter comprising a connecter member suitable in size to fit into a box hole, and formed to expose a portion of the box hole edge to a cable, including spaced anchorage means in between which a box hole edge movably rests to anchor the connecter in a box hole; a stationary screw support, and a screw mounted for free turning in the support and threaded into the connecter member to move the latter to grip a cable between the connecter and exposed box hole edge.

11. A cable connecter comprising a member formed to expose a portion of a box hole edge when the connecter is mounted in a box hole, and including inside and outside box wall abutment means, the two abutment means being disposed in spaced relation for the reception of a box hole edge therebetween; a screw support adapted to rest against a box, and a screw loosely carried in the support and threaded into the inside abutment to forcibly move the latter in respect to the box hole to grip a cable between the exposed box hole edge and connecter.

12. A cable connecter comprising, a connecter member suitable in size to fit through a box hole and formed to expose a part of the box hole edge, said member having offset ends by which one end rests against the outside wall of a box and the other end rests against the inside wall of a box, said member being provided with a cable passage which registers with a box hole; a screw support adapted to rest on a box wall, and a screw carried by the support in spaced relation from the box and a cable operatively engaging the connecter member to move the latter in relation to the box to grip a cable between the exposed box hole edge and connecter member.

13. A cable connecter comprising, a connecter member suitable in size to fit through a box hole and formed to expose a part of the box hole edge, said member having offset ends by which one end rests against the outside wall of a box and the other end rests against the inside wall of a box, said member being provided with a cable passage which registers with a box hole; a screw support adapted to rest against a box; and a screw carried for free rotation on the support, threaded into the connecter member, out of engagement with a cable and box, to force the connecter member in relation to the box.

14. Cable and box connecting means comprising, a box provided with a cable and connecter receiving hole, a cable gripping plate placed adjacent the box hole and being provided with a hole to receive a cable into the box and including a portion extending through the box hole to secure the connecter to the box; another plate spaced therefrom with one end resting against the box wall, and operating means carried at the other end of the latter plate and cooperating with the cable gripping plate to move the latter in relation to the box hole to grip a cable between said gripping plate and the box hole edge.

15. Cable and box connecting means comprising, a box provided with a cable and connecter receiving hole, a connecter embodying two parts one of which is formed to fit into and expose the edge of the box hole and is itself provided with a hole through which a cable is passed, the other part constituting screw support means resting against the box, and a screw carried by the support means and threaded into the first part to move it in relation to the box to grip the cable between the exposed edges of the two holes.

16. A cable and box connecting means as defined in claim 15 wherein both parts are made of sheet metal and constitute plates, one of which is stationary to carry the screw freely rotatable therein.

17. Cable and box connecting means comprising, a box provided with a cable and connecter receiving hole, a connecter member provided with cable opening and suitable in size to fit into the box hole and formed to expose a portion of said box hole edge to a cable, said member including spaced anchorage means by which it is guided and retained in a box hole while moving in relation thereto; a screw mounted inside of the box above the cable with said screw head directly accessible through the open end of the box to grip a cable between the exposed box hole edge and connecter; and means to support the screw above the cable.

18. Cable and box connecting means as defined in claim 17 wherein the screw operating means inside the box is supported in spaced relation from the box and from the cable and forcibly moves said cable relatively to the box hole to grip it between the member and exposed box hole edge.

19. Cable and box connecting means comprising, a box having a cable and connecter receiving hole, a connecter provided with a cable opening and suitable in size to fit into the box hole and formed to expose a portion of said box hole edge directly to the cable and conceal the other portion therefrom, said connecter including spaced anchorage means in between which the box hole edge is received, by which the connecter is guided and retained in a box hole, while said anchorage means move in relation to said box hole edge; a screw mounted inside of the box with said screw head directly accessible through the open box, to grip a cable between the exposed box hole edge and connecter and simultaneously secure the spaced anchorage means in rigid position inside and outside the box wall; and means supporting the screw in spaced relation from the box wall and cable.

20. Cable and box connecting means comprising, a box provided with a cable and connecter receiving hole, a connecter plate having a cable hole registering with the box hole and said plate being suitable in size to fit into the box hole and formed to expose said box hole edge to the cable, spaced anchorage notches formed in the edges of the plate between and in which the box hole edge is retained to anchor the connecter to the box; a screw which is accessible through the open end of the box above the cable, to move the connecter in the box hole and force the cable laterally to grip it between the exposed box hole edge and plate; and means supporting the screw in spaced relation from the box wall and cable.

In testimony whereof I affix my signature.

GEORGE C. THOMAS, Jr.